United States Patent
Tang et al.

(10) Patent No.: US 10,196,460 B2
(45) Date of Patent: Feb. 5, 2019

(54) GRAPHENE-CONTAINING VISCOSE FIBER AND PREPARATION METHOD THEREOF

(71) Applicant: Jinan Shengquan Group Share Holding Co., Ltd., Ji'nan (CN)

(72) Inventors: Yilin Tang, Ji'nan (CN); Chengzhen Jiang, Ji'nan (CN); Jinzhu Zhang, Ji'nan (CN); Shaofeng Gao, Ji'nan (CN); Ripeng Xu, Ji'nan (CN)

(73) Assignee: JINAN SHENGQUAN GROUP SHARE HOLDING CO., LTD., Ji'nan (CN)

( * ) Notice: Subject to any disclaimer, the term of this patent is extended or adjusted under 35 U.S.C. 154(b) by 0 days.

(21) Appl. No.: 15/307,713

(22) PCT Filed: Nov. 11, 2015

(86) PCT No.: PCT/CN2015/094290
§ 371 (c)(1),
(2) Date: Oct. 28, 2016

(87) PCT Pub. No.: WO2016/078523
PCT Pub. Date: May 26, 2016

(65) Prior Publication Data
US 2017/0051078 A1    Feb. 23, 2017

(30) Foreign Application Priority Data
Nov. 20, 2014    (CN) .......................... 2014 1 0670057

(51) Int. Cl.
| C08B 9/00 | (2006.01) |
| D01F 2/08 | (2006.01) |
| C01B 32/184 | (2017.01) |
| C01B 32/194 | (2017.01) |

(52) U.S. Cl.
CPC .............. *C08B 9/00* (2013.01); *C01B 32/184* (2017.08); *C01B 32/194* (2017.08); *D01F 2/08* (2013.01)

(58) Field of Classification Search
None
See application file for complete search history.

(56) References Cited

U.S. PATENT DOCUMENTS

2011/0001086 A1*  1/2011  Kruckenberg ........ B82Y 30/00
                                                             252/182.32

FOREIGN PATENT DOCUMENTS

| CN | 101736646 | 6/2010 |
| CN | 103046151 | 4/2013 |
| CN | 103449399 | 12/2013 |
| CN | 103466613 | 12/2013 |
| CN | 103556275 | 2/2014 |
| CN | 103570951 | 2/2014 |
| CN | 103641111 | 3/2014 |
| CN | 103966844 | 8/2014 |
| CN | 104016341 | 9/2014 |
| CN | 104328523 | 2/2015 |
| KR | 20120063857 | 6/2012 |

OTHER PUBLICATIONS

Sun et al.; Enhanced Mechanical and Thermal Properties of Regenerated Cellulose/Graphene Composite Fibers; Carbohydrate Plymers; 111; 456-462; May 20, 2014.*
Wu, Tao et al., "Progress in Graphene Conductive Polymer Composites," China Rubber/Plastics Technology and Equipment, 2015, 40(2):1-6 (English Abstract).
International Search Report for International Application PCT/CN2015/094290, dated Jan. 27, 2016.
First Office Action from corresponding Chinese application CN 201410670057.2, dated May 6, 2015.
Second Office Action from corresponding Chinese application CN 201410670057.2, dated Jun. 17, 2015.
Search Report from corresponding Chinese application CN 201410670057.2, dated Apr. 28, 2015 (English translation).
Supplemental Search Reports from corresponding Chinese application CN 201410670057.2, dated Jun. 8, 2015 (English translation).
Supplemental Search Reports from corresponding Chinese application CN 201410670057.2, dated Oct. 14, 2015 (English translation).

* cited by examiner

*Primary Examiner* — Guinever S Gregorio
(74) *Attorney, Agent, or Firm* — Lathrop Gage LLP

(57) ABSTRACT

The present invention relates to a graphene-containing viscose fiber and a preparation method thereof, wherein the graphene is a non-oxidized graphene of no more than 10 layers. The preparation method comprises introducing a graphene into a viscose prior to spinning. The viscose fiber obtained according to the present invention possesses significant far-infrared and antibacterial properties.

13 Claims, No Drawings

GRAPHENE-CONTAINING VISCOSE FIBER AND PREPARATION METHOD THEREOF

CROSS-REFERENCE TO RELATED APPLICATIONS

This application is a U.S. National Stage Application filed under 35 U.S.C. § 371 of International Application No. PCT/CN2015/094290, filed Nov. 11, 2015, which claims the benefit of Chinese Application No. 201410670057.2, filed Nov. 20, 2014. Both of these applications are hereby incorporated by reference in their entireties.

TECHNICAL FIELD

The present invention relates to a viscose fiber and a preparation process thereof, and particularly to a graphene viscose fiber and a preparation process thereof.

BACKGROUND ART

Viscose fiber is mainly prepared by natural celluloses such as linter, corncob, wood, and a small amount of bamboo and so on, as raw materials, which undergo a series of processes, such as stewing, bleaching and so on, to prepare a dissolving pulp with a very high purity of cellulose, and then undergo working sections involving impregnating, squeezing, crushing, ageing, xanthation, dissolving, mixing, filtering, debubbling, filtering, spinning, post-treatment, drying, packaging and the like. Currently, the viscose fiber is mostly used as textile fiber.

CN 103046151 A discloses a graphene blend regenerated cellulose fiber, which is prepared by mixing an oxidized graphene solution and a regenerated cellulose solution, molding the mixture through a viscose wet spinning process, and then reducing the mixture. The viscose fiber obtained through this method is slightly improved in terms of strength, and its dry breaking strength can be up to 2.62 cN/dtex, and its wet breaking strength reaches 1.54 cN/dtex. Moreover, these disclosed contents display the effect of the grapheme of enhancing strength of the fiber.

CN 103556275 A discloses a far-infrared bamboo charcoal viscose fiber and a preparation method thereof. In order to develop far-infrared bamboo charcoal viscose fiber which is not available in the existing art, and to address the problem of poor spinnability of the bamboo charcoal viscose fiber, the present invention provides a far-infrared bamboo charcoal viscose fiber and a preparation method thereof, characterized in that in the fiber, the content of a far-infrared ceramic powder is 1-10% by weight, the content of a bamboo charcoal is 0.1-10% by weight, while the far-infrared emissivity is greater than 80%, the ammonia absorption rate is not lower than 50%, the permeability is not lower than 500 mm/s, and the color fastness to washing is grade 4-5. In the present invention, not only does the far-infrared bamboo charcoal viscose fiber have heat insulation effects, but also the radiated far-infrared rays have health-care functions of activating cell tissues and promoting the blood circulation.

Moreover, these disclosed contents indicate that the far-infrared effects are obtained by introducing the ceramic powder.

Disclosure of the Invention

The present invention provides a new viscose fiber and a preparation method thereof so as to further improve the far-infrared functions as well as the antibacterial and bacteriostatic properties of the viscose fiber.

According to the present invention, a method for preparing a viscose fiber comprises: adding a graphene with no more than 10 layers to a viscose or a semi-finished viscose product.

Preferably, the amount/quantity of the graphene added is 0.05-1.0%, more preferably 0.2-0.8%, of α-cellulose in the viscose.

Raw materials used/employed in the present invention for the preparation of the graphene are derived from biomass, and the biomass resources are selected from any one of vegetables and/or agricultural and forestry wastes or a combination of at least two thereof, preferably selected from any one of coniferous wood, broadleaf wood, leaf wood, and agricultural and forestry wastes or a combination of at least two thereof; the agricultural and forestry wastes are preferably selected from any one of corn stalk, corncob, sorghum stalk, sugar beet pulp, bagasse, furfural residue, xylose residue, sawdust, cotton stalk, husk, and reed or a combination of at least two thereof, and preferably corncob, which is currently already sold publicly.

The graphene prepared from the biomass raw materials, especially the corncob, displays/exhibits porosity at the microcosmic level, so that the specific surface area is increased/rendered larger, especially in the case of the graphene prepared by the applicant.

In one preferable embodiment, the preparation of the viscose comprises steps of impregnating, squeezing, crushing, ageing, xanthation, dissolving, ripening, filtering and debubbling, wherein the graphene is introduced prior to the filtering.

Further, the graphene is firstly prepared into a disperse system, wherein a dispersed solvent is water. A solid content of the disperse system is 10-40%.

In another preferable embodiment, the preparation of the viscose comprises steps of impregnating, squeezing, crushing, ageing, xanthation, dissolving, ripening, filtering, and debubbling, wherein the graphene is introduced during the dissolving step, and the graphene is dispersed in advance in a dilute alkaline solution which is utilized to dissolve the cellulose xanthates.

The present invention further relates to a viscose fiber, comprising a graphene, wherein the graphene is not an oxidized graphene.

The non-oxidized graphene specifically refers to the graphene not prepared and obtained through/via an oxidation-reduction method, or the graphene whose preparation process does not involve an oxidization step.

The graphene can possess a hexatomic-ring honeycomb-like lamellar structure which exhibits a conformation of any one selected from warping, crinkling, and folding or a combination of at least two thereof.

A microstructure of the lamellar structure of the graphene typically can be observed and obtained through an electron microscope, which can be a transmission electron microscope or a scanning electron microscope.

In the present invention, the specific graphene is used in the viscose fiber, and the foregoing optimization is performed for the preparation method. The viscose fiber obtained has a detected far-infrared normal emissivity greater than 0.80, preferably greater than 0.85, for example, 0.87, 0.89, 0.91, 0.92, 0.93 and so on, and more preferably greater than 0.88.

DETAILED DESCRIPTION OF EMBODIMENTS

Graphene used in the present invention is the graphene with no more than 15 layers, preferably no more than 10 layers. In an example of the present invention, the graphene used is manufactured by the applicant of the present application, which has 3-10 layers and is obtained through thermal treatment of cellulose, belonging to non-oxidized graphene.

The graphene is obtained by taking corncobs as starting materials to prepare and obtain porous celluloses, and then subjecting the porous celluloses to gradient heating treatment. ON 104016341 A discloses a specific preparation method, and contents disclosed therein are incorporated herein by reference.

In one example, the preparation method of the graphene specifically comprises the following steps:

1) hydrolyzing corncobs in an acid to afford lignocelluloses;

2) treating the lignocelluloses with a treatment agent at 70° C.-180° C., preferably 90° C.-150° C., most preferably 100° C.-120° C., to afford porous celluloses, wherein the treatment agent used is an acid, acid-sulfite, or alkali-sulfite, wherein the acid is preferably sulfuric acid, the alkali is preferably calcium hydroxide, sodium hydroxide, ammonium hydroxide or magnesium hydroxide, and the sulfite is preferably calcium sulfite, magnesium sulfite, sodium sulfite or ammonium sulfite;

3) treating the porous celluloses with a catalyst selected from ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate, and nickel acetate, wherein a processing temperature is 50° C.-150° C., preferably 80° C.-120° C.;

4) in an oxygen-free environment, placing the porous celluloses obtained in the previous step successively at 300° C.-400° C., 800° C.-900° C., 1100° C.-1300° C., 300° C.-400° C., and 900° C.-1000° C. for thermal insulation to provide a graphene precursor;

5) washing the graphene precursor with alkali, acid, and water respectively to afford the final product graphene.

Although the corncobs are used in the method mentioned above, it is reasonable to theoretically infer that it is also practicable to utilize other plant resources, therefore, other plant resources are not excluded from the present invention.

According to the present invention, in order to obtain the viscose fiber with the far-infrared and antibacterial functions, the graphene is added into the viscose. The quantity of the graphene does not exceed 1% of the content of α-cellulose in the viscose, preferably 0.05-0.99%, more preferably 0.1-0.8%, and more preferably 0.3-0.5%.

The viscose used in the present invention is a viscose well known in the prior art, and its preparation method is as follows: subjecting pulps, which are taken as raw materials, to procedures involving impregnating, squeezing, crushing, ageing, xanthation, dissolving, ripening, filtering, debubbling and so on. The pulps are impregnated in an approximately 18% aqueous solution of sodium hydroxide, so that celluloses are transformed into alkali celluloses, hemicelluloses are dissolved out, and the degree of polymerization is partially decreased; the excessive alkaline solution is then removed by squeezing. Alkali cellulose lumps become loose flocs after being crushed by a pulverizer. Due to the increase of the surface area, the uniformity of the following chemical reaction is improved. Oxidative decomposition occurs to the alkali celluloses under the effect of oxygen, resulting in the decrease in the average polymerization degree, and this process is called ageing. The reaction between alkali celluloses and carbon disulfide to afford cellulose xanthate after the ageing is called xanthation, which further weakens hydrogen bonds between macromolecules. Due to the hydrophilicity of xanthate group, the solubility of the cellulose xanthates in dilute alkaline solution is greatly/significantly improved. The viscose is obtained just by dissolving the solid cellulose xanthates in the dilute alkaline solution. The viscose which is just prepared is not easy to take shape owing to its relatively high viscosity and salinity. Accordingly, it has to be placed for a certain period at a certain temperature, which is called ripening, so that the sodium cellulose xanthates in the viscose are gradually hydrolyzed and saponified, the degree of esterification is reduced, and the viscosity as well as stability to the effects of an electrolyte also changes therewith. After the ripening, debubbling and filtering should be carried out to remove bubbles and impurities.

Generally, the graphene can be introduced in a plurality of above-mentioned steps for preparing the viscose, for example, prior to crushing, prior to ageing, prior to xanthation, or prior to ripening. The graphene will generally not be introduced after filtering or debubbling. Preferably in the present invention, the graphene is introduced after ripening and prior to filtering. The inventor has found that the mixing efficiency is higher if the graphene is added at this time, as a result, more than half of the mixing time can be reduced, and two-thirds of the mixing time can generally be reduced.

Preferably in the present invention, the graphene is firstly prepared into a disperse system, and then the dispersed solution is evenly mixed with the viscose. A preferable dispersed solvent is water. Preferably, the graphene is prepared into a disperse system with a solid content of 0.1-1%.

One more preferable way is to firstly disperse the graphene in a dilute alkaline solution which is used to dissolve the cellulose xanthates, and after the dispersion, the xanthated celluloses, i.e. cellulose xanthates, are added. The advantage of this method is that it is unnecessary to introduce additional water due to the introduction of the graphene, the celluloses are bound with the graphene just after the dissolution, resulting in a more uniform mixing. In such embodiment, it is not required to stir for a long time when dispersing the graphene in the dilute alkaline solution and after adding the cellulose xanthates. Only a short-time stirring after the ripening can take effect, which can significantly enhance/improve the dispersion efficiency of the graphene.

Next, the final viscose fibers are obtained through spinning, desulfurization, water-washing, oiling, and drying following filtering and debubbling. These are conventional methods and will not be described in detail herein.

Example 1—Preparation of Graphene

Corncobs were hydrolyzed in sulfuric acids at 90° C. for 10 min to afford lignocelluloses, wherein the mass of the sulfuric acid utilized was 3% of the mass of the corncob; the lignocelluloses were treated with a treatment agent comprising sulfuric acid and magnesium sulfite mixed at 2:1 at 70-180° C. to provide porous celluloses, wherein the mass of the sulfuric acid utilized was 4% of the mass of the lignocellulose. The porous celluloses were bleached using hydrogen peroxide, wherein the mass of the hydrogen peroxide utilized was 5% of the mass of the porous cellulose, and the bleaching by hydrogen peroxide was carried out 100° C. for 5 h.

The mixture of the porous celluloses obtained above and manganese chloride were stirred at 20° C. for 2 h to carry out a catalyzing treatment, wherein a mass ratio of the manganese chloride to the porous cellulose was 0.01:1; the product obtained after the catalyzing treatment was dried at 70° C. to afford the first intermediate product with a water content less than 10 wt %.

The first intermediate product was placed in a carbonization furnace, nitrogen was fed as a protective gas into the carbonization furnace at a gas feeding rate of 200 mL/min, and the first intermediate product was heated from 25° C. to 300° C. at a rate of 5° C./min and incubated for 4 h to provide the second intermediate product; the second intermediate product was heated from 300° C. to 800° C. at a rate of 20° C./min and incubated for 3.5 h to afford the third intermediate product; the third intermediate product was heated from 800° C. to 1100° C. at a rate of 50° C./min and incubated for 6 h to provide the fourth intermediate product; the fourth intermediate product was cooled from 1100° C. to 900° C. at a rate of 30° C./min and incubated for 2 h; after the temperature reduction, the fourth intermediate product was cooled to 60° C.

The cooled fourth intermediate product mentioned above was washed in a 3 wt % aqueous solution of sodium hydroxide at 60° C. for 4 h to afford the first washed product; at 70° C., the first washed product was washed in a 4 wt % aqueous solution of hydrochloric acid at 60° C. for 4 h to afford the second washed product; the second washed product was washed with distilled water until being neutral, and then dried to afford the graphene.

Example 2—Preparation of Viscose Fiber

Linters, which were taken as the raw materials, underwent impregnating, alkalization, squeezing, crushing, ageing, xanthation, dissolving, and ripening to afford the viscose with a solid content of 8%; the graphene obtained in Example 1 was dispersed with water whose mass was 5 times that of the graphene, and then, the dispersed solution containing graphene was blended with the viscose and stirred with a high-speed agitator for 1 h, forming a blended solution, wherein the quantity of the graphene used was 0.1% of the mass of the cellulose. Graphene viscose fibers were obtained through filtering and debubbling, followed by spinning, desulfurization, water-washing, and drying. Specifically, a coagulating bath was consisted of 105 g/sulfuric acid, 200 g/L sodium sulfate, and 12 g/L zinc sulfate. The graphene viscose fibers obtained had a far-infrared normal emissivity of 0.85, and antibacterial and bacteriostatic activity with an inhibitory rate of 85% against *Staphylococcus aureus*.

Example 3—Preparation of Viscose Fiber

Xanthated linter celluloses were dissolved in a dilute solution of sodium hydroxide, wherein the graphene obtained in Example 1 was added to the dilute sodium hydroxide solution in advance. After ripening, a viscose with a solid content of 8% was prepared and obtained, which was stirred with a high-speed agitator for half an hour, wherein the quantity of the graphene used was 0.6% of the mass of the cellulose. Graphene viscose fibers were prepared and obtained through filtering and debubbling, followed by spinning, desulfurization, water-washing, and drying. Specifically, a coagulating bath was consisted of 105 g/L sulfuric acid, 200 g/L sodium sulfate, and 12 g/L zinc sulfate. The graphene viscose fibers obtained had a far-infrared normal emissivity of 0.88, and antibacterial and bacteriostatic activity with an inhibitory rate of 95% against *Staphylococcus aureus*.

Example 4—Preparation of Viscose Fiber

With corncobs as the raw materials, xanthated corncob celluloses were dissolved in a dilute solution of sodium hydroxide, wherein the graphene obtained in Example 1 was added to the dilute sodium hydroxide solution in advance. After ripening, a viscose with a solid content of 10% was prepared and obtained, and the viscose was stirred with a high-speed agitator for half an hour, wherein the quantity of the graphene was 1% of the mass of the cellulose. Corncob viscose celluloses were prepared and obtained through filtering and debubbling, followed by spinning, desulfurization, water-washing, and drying. Specifically, a coagulating bath was consisted of 105 g/L sulfuric acid, 200 g/L sodium sulfate, and 12 g/L zinc sulfate. The corncob viscose fibers obtained had a far-infrared normal emissivity of 0.90, and antibacterial and bacteriostatic activity with an inhibitory rate of 97% against *Staphylococcus aureus*.

Control Example 1

Linters, which were taken as the raw materials, underwent impregnating, alkalization, squeezing, crushing, ageing, xanthation, dissolving, and ripening to afford the viscose with a solid content of 8%, and the viscose was stirred with a high-speed agitator for half an hour. Graphene viscose fibers were obtained through filtering and debubbling, followed by spinning, desulfurization, water-washing, and drying. Specifically, a coagulating bath was consisted of 105 g/L sulfuric acid, 200 g/L sodium sulfate, and 12 g/L zinc sulfate. The graphene viscose fibers obtained had a far-infrared normal emissivity of 0.70, and antibacterial and bacteriostatic activity with an inhibitory rate of 20% against *Staphylococcus aureus*.

Control Example 2

A method of preparing a graphene by taking graphite as the raw materials includes the following steps:

1) adding 50 mL of concentrated nitric acid to a mixed solution containing 5 g of graphite flakes and 150 mL of concentrated sulfuric acid, stirring the mixture at normal temperature for 24 h, which was washed with deionized water three times, dried at 60° C., to afford a graphite intercalation compound;

2) quickly expanding the graphite intercalation compound obtained above at 1050° C. for 30 s to provide the expanded graphite;

3) slowly adding 3 g of potassium permanganate to a mixture containing 0.3 g of the expanded graphite obtained above and 60 mL of concentrate sulfuric acid, which was stirred at 60° C. for 24 h, adding 60 mL of deionized water and 15 mL of hydrogen peroxide in an ice bath, washing the mixture until being neutral, to afford an oxidized graphene;

4) dispersing the oxidized graphene obtained above in water, separating the oxidized graphene by centrifugation; performing centrifugation at a rotational speed of 8000 rmp for a period of 40 min to provide Supernatant 1 and Precipitate 1, wherein Supernatant 1 obtained is just the small-sized oxidized graphene; dispersing Supernatant 1, transferring the oxidized graphene onto a polyethylene terephthalate plastic (PET) substrate through a transfer printing process, which was reduced with hydroiodic acid at 50° C. for 60 min, to afford graphene.

Xanthated corncobs celluloses were dissolved in a dilute solution of sodium hydroxide, wherein the graphene prepared and obtained by the oxidation-reduction method mentioned above was added to the dilute sodium hydroxide solution in advance. After ripening, a viscose with a solid content of 10% was prepared and obtained, which was stirred with a high-speed agitator for half an hour, wherein the quantity of the graphene used was 1% of the mass of the cellulose. Graphene viscose fibers were prepared and obtained through filtering and debubbling, followed by spinning, desulfurization, water-washing, and drying. Specifically, a coagulating bath consisted of 105 g/L sulfuric acid, 200 g/L sodium sulfate, and 12 g/L zinc sulfate. The graphene viscose fibers obtained had a far-infrared normal emissivity of 0.80, and antibacterial and bacteriostatic activity with an inhibitory rate of 50% against *Staphylococcus aureus*.

Specifically, the infrared test data were tested by China National Textiles Supervision Testing Center, according to the test method FZ/T64010-2000.

The antibacterial test data were tested by China National Textiles Supervision Testing Center, according to the test method GB/T20944.3-2008.

In the present invention, graphene prepared by the applicant has been utilized in the preparation of viscose fibers, which has significantly improved far-infrared properties and antibacterial properties of the existing common viscose fibers, while no similar effects have been observed in the prior art.

The invention claimed is:
1. A method for preparing a viscose fiber, comprising:
  adding a graphene with no more than 10 layers to a viscose or a semi-finished viscose, wherein the graphene added is a non-oxidized graphene, wherein the graphene is prepared by a method comprising:
  1) hydrolyzing corncobs in an aqueous inorganic acidic solution to generate lignocelluloses;
  2) treating the lignocelluloses with a treatment agent at 70° C.-180° C. to provide porous celluloses, wherein the treatment agent is selected from the group consisting of an acid, an acid-sulfite, an alkali-sulfite and combination thereof;
  3) treating the porous celluloses with a catalyst selected from the group consisting of manganese chloride, ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate, and nickel acetate, and conducting a drying step at a drying temperature of 50° C.-150° C.;
  4) in an oxygen-free environment, placing the porous celluloses obtained in the previous step successively at 300° C.-400° C., 800° C.-900° C., 1100° C.-1300° C., 300° C.-400° C., and 900° C.-1000° C. to provide a graphene precursor; and
  5) washing the graphene precursor with alkali, acid, and water respectively to generate the graphene.

2. The method according to claim 1, wherein the quantity of the graphene used is 0.05-1.0% of α-cellulose in the viscose or semi-finished viscose.

3. The method according to claim 2, wherein the quantity of the graphene is 0.2-0.8% of α-cellulose in the viscose or semi-finished viscose.

4. The method according to claim 1, wherein preparation of the viscose fiber comprises steps of impregnating, squeezing, crushing, ageing, xanthation, dissolving, ripening, filtering, and debubbling of a pulp, and wherein the graphene is added to the viscose prior to the filtering step.

5. The method according to claim 4, wherein the graphene is firstly prepared into a disperse system comprising water as a dispersed solvent and wherein a solid content of the disperse system is 0.1-1%.

6. The method according to claim 1, wherein preparation of the viscose fiber comprises steps of impregnating, squeezing, crushing, ageing, xanthation, dissolving, ripening, filtering, and debubbling of a pulp, and wherein the graphene is added to the semi-finished viscose during the dissolving step, and the graphene is dispersed in advance in a dilute alkaline solution which is used to dissolve cellulose xanthates.

7. The method according to claim 6, wherein the viscose containing the graphene is stirred at a high speed for half an hour after the ripening step.

8. The method according to claim 1, wherein the lignocelluloses are treated with a treatment agent at 90° C.-150° C.

9. The method according to claim 1, wherein the lignocelluloses are treated with a treatment agent at 100° C.-120° C.

10. The method according to claim 1, wherein the treatment agent is sulfuric acid.

11. The method according to claim 1, wherein the alkali is calcium hydroxide, sodium hydroxide, ammonium hydroxide or magnesium hydroxide.

12. The method according to claim 1, wherein the sulfite is calcium sulfite, magnesium sulfite, sodium sulfite or ammonium sulfite.

13. The method according to claim 1, wherein the drying temperature is 80° C.-120° C.

* * * * *